United States Patent [19]
Pusic et al.

[11] Patent Number: 4,966,109
[45] Date of Patent: Oct. 30, 1990

[54] HYDRAULIC CONNECTING ROD

[75] Inventors: Pavo Pusic, 164 McKinley Ave., East Hanover, N.J.; Bozo Memed, Balda Mekisica 3, 50000 Dubrovnik, Yugoslavia

[73] Assignees: Hitachi Construction Machinery Co., Ltd.; Hitachi, Ltd., both of Tokyo, Japan

[21] Appl. No.: 333,685

[22] Filed: Apr. 5, 1989

[51] Int. Cl.$^5$ ............................................. F02B 75/32
[52] U.S. Cl. ................................. 123/197 AB; 92/61; 92/146; 74/579 E; 123/78 E
[58] Field of Search .......... 74/579 E; 92/85 R, 85 B, 92/126, 127, 129, 142, 163, 12, 61, 62, 146, 153; 123/41.31, 41.36, 41.34, 197 AB, 197 AC, 78 E; 91/420, 421, 440

[56] References Cited

U.S. PATENT DOCUMENTS

| | | | |
|---|---|---|---|
| 2,104,802 | 1/1938 | Hansen | 123/197 AB |
| 2,134,995 | 11/1938 | Anderson | 123/197 AB |
| 2,252,153 | 8/1941 | Anthony | 123/197 AB |
| 3,025,840 | 3/1962 | Casini | 123/197 AC |
| 4,111,164 | 9/1978 | Wuerfel | 123/78 E |
| 4,140,091 | 2/1979 | Showers, Jr. | 123/78 E |
| 4,195,601 | 4/1980 | Crise | 123/78 E |
| 4,370,901 | 1/1983 | Bolen | 91/352 |
| 4,463,725 | 8/1984 | Laufer et al. | 123/446 |
| 4,724,800 | 2/1988 | Wood | 123/197 AC |

FOREIGN PATENT DOCUMENTS

| | | | |
|---|---|---|---|
| 2607157 | 8/1977 | Fed. Rep. of Germany | 92/12 |
| 3017403 | 11/1981 | Fed. Rep. of Germany | 92/12 |
| 13677 | 6/1912 | United Kingdom | 92/12 |

Primary Examiner—Edward K. Look
Assistant Examiner—Thomas Denion
Attorney, Agent, or Firm—Marks Murase & White

[57] ABSTRACT

A connecting rod for an internal-combustion, steam or the like, engine, having hydraulic means for converting the reciprocating motion of engine piston to the rotating motion of crankshaft. While producing the same torque on crankshaft, the hydraulic connecting rod enables the crankshaft throw to be shorter and, therefore, enables a decrease of the centrifugal force and inertia load produced by crankshaft rotating motion. Furthermore, the present invention enables a significant decrease of piston-ring friction and significantly reduces total engine friction. The present invention also yields significant decreases of centrifugal, inertia and friction loads resulting in a significant increase of total engine efficiency and power output.

20 Claims, 5 Drawing Sheets

HYDRAULIC CONNECTING ROD

BACKGROUND OF THE INVENTION

Connecting rods have been used in every steam or internal-combustion engine (except jet and rocket engines) since such engines have been used. Connecting rods connect a piston to a throw (offset portion) of a crankshaft and convert the reciprocating motion of the piston to rotating motion of the crankshaft. Known connecting rods are typically made of forged steel or powdered iron and have a predetermined invariable length which is proportional to the piston stoke length. The connecting rod transmits the force produced by an engine piston's downward stroke (power stroke) to the crankshaft without influencing said force. The connecting rod also does not influence the force transmitted from the crankshaft to the piston, during piston's upward motion. In both cases the force exerted on one end of the connecting rod equals the force exerted on its opposite end. The connecting rod does not allow any change in crankshaft throw rotating motion diameter which is always equal to the engine piston reciprocating motion diameter.

SUMMARY OF THE INVENTION

The connecting rod of the present invention is designed such that the resultant load of the force produced by engine piston reciprocating motion is increased without enlarging piston or cylinder size or increasing fuel consumption. The connecting rod of the present invention comprises two hydraulic pistons having different diameters (located in two hydraulic cylinders) which will develop equal torque on the crankshaft while having shorter crankshaft throw and, therefore, cause centrifugal and inertia loads to decrease. Since the force developed by combustion pressure, which acts along the connecting rod, is decreased by centrifugal and inertia loads, the decrease of these loads will result in an increase of the resultant or effective load.

The smaller hydraulic piston is built on, i.e., connected to, the engine piston and the larger hydraulic piston is built on, i.e., connected to, the crankshaft side of the hydraulic connecting rod. According to the process of the present invention, the force exerted on the smaller piston is increased when exerted on the larger piston by the fluid located between the two hydraulic pistons. According to the law of hydraulics which requires that the force per unit area exerted by the smaller piston on the fluid and the force per unit area exerted by the fluid on the larger piston be the same, the total force exerted on the larger piston is many times the total force exerted by the smaller piston. For example, if a pressure of 10 lbs. is applied to a smaller piston, that has an area of 4 sq. inches, the same pressure transmitted on a larger piston, that has an area of 8 sq. inches, would result in a total force exerted on the larger piston of 20 lbs. As the volume of fluid displaced by each piston is the same, the smaller piston is forced to a depth which is proportionally longer than the depth of the large piston according to the ratio of their diameters. In other words, the smaller piston travels a proportionately greater distance so that work (force x distance) remains constant. Since the larger piston (which is connected to the crankshaft) travels a shorter distance the diameter of the crankshaft throw rotating motion is shortened in proportion to the pistons' diameter ratio. For example, if the ratio of the piston head areas of the two hydraulic pistons is 1:2, the crankshaft throw rotating motion diameter will be two times shorter than (one half) the engine piston reciprocating motion diameter.

Because of the shorter crankshaft throw, a proportionally smaller counterweight is needed to offset the eccentric masses of metal in the crankshaft throw. As a result of the shorter crankshaft throws and the use of smaller counterweights, centrifugal and inertia loads are significantly diminished and total crankshaft weight is decreased. Under a given set of conditions, the centrifugal load of rotating crankshaft throw and counterweight decreases proportionally to a decrease in throw and counterweight radius. Also under a given set of conditions, the inertia load of a rotating throw and counterweight decreases by a factor of four when the throw and counterweight are two times shorter (shorter by a factor of two). Therefore, during the piston's power stroke, the resultant load of the combustion pressure, acting along the connecting rod, will increase and the engine will accelerate and slow down much easier. Since transmitting the force through the hydraulic fluid results in less vibration in the engine, the flywheel mass will also decrease causing the total centrifugal and inertia loads to further decrease. Consequently, the total crankshaft torque will significantly increase.

For example, if the ratio of the piston head areas of the two hydraulic pistons is 1:2, the force exerted on the smaller piston by the engine piston will be increased two times when exerted on the bottom end of the larger piston's connecting rod which is mounted on the crankshaft throw, assuming that no significant friction loss occurs between the two said points of exertion. Since the crankshaft throw rotating diameter in this case is only half of the engine piston's reciprocating motion diameter, the crankshaft torque will equal the torque obtained using a connecting rod of the type known in the prior art during the piston power stroke. During the engine piston's upward stroke, the force exerted by the crankshaft throw on the bottom end of the larger hydraulic piston connecting rod is two times smaller when exerted on upper end of the smaller hydraulic piston and equals the force provided when a prior art connecting rod is used.

In sum, it is an object of the present invention to provide a device which will enable a significant increase in engine power output and, consequently, yield a significant reduction in fuel consumption and environmental pollution. In addition to the above stated advantages, the present invention will eliminate most piston-ring friction which results from side thrust and, consequently, eliminate most engine friction load.

It is to be understood that although the present description refers to four-stroke, in line, internal-combustion engine, having a hydraulic connecting rod with a hydraulic piston ratio of 1:2, the present invention can also be applied to any type of two-stroke engine having any hydraulic piston ratio proven the most suitable for the purpose of increasing total engine power output.

Since the shape of the present invention demands significantly more space than the connecting rod in the prior art, it is also an object of the present invention to provide two types of the hydraulic connecting rod, having different physical configurations, in order to maximize benefits in different types of engines.

The features and advantages of the present invention will become apparent from the following brief description of drawings and description of the preferred embodiment.

DETAILED DESCRIPTION

Figure 1:
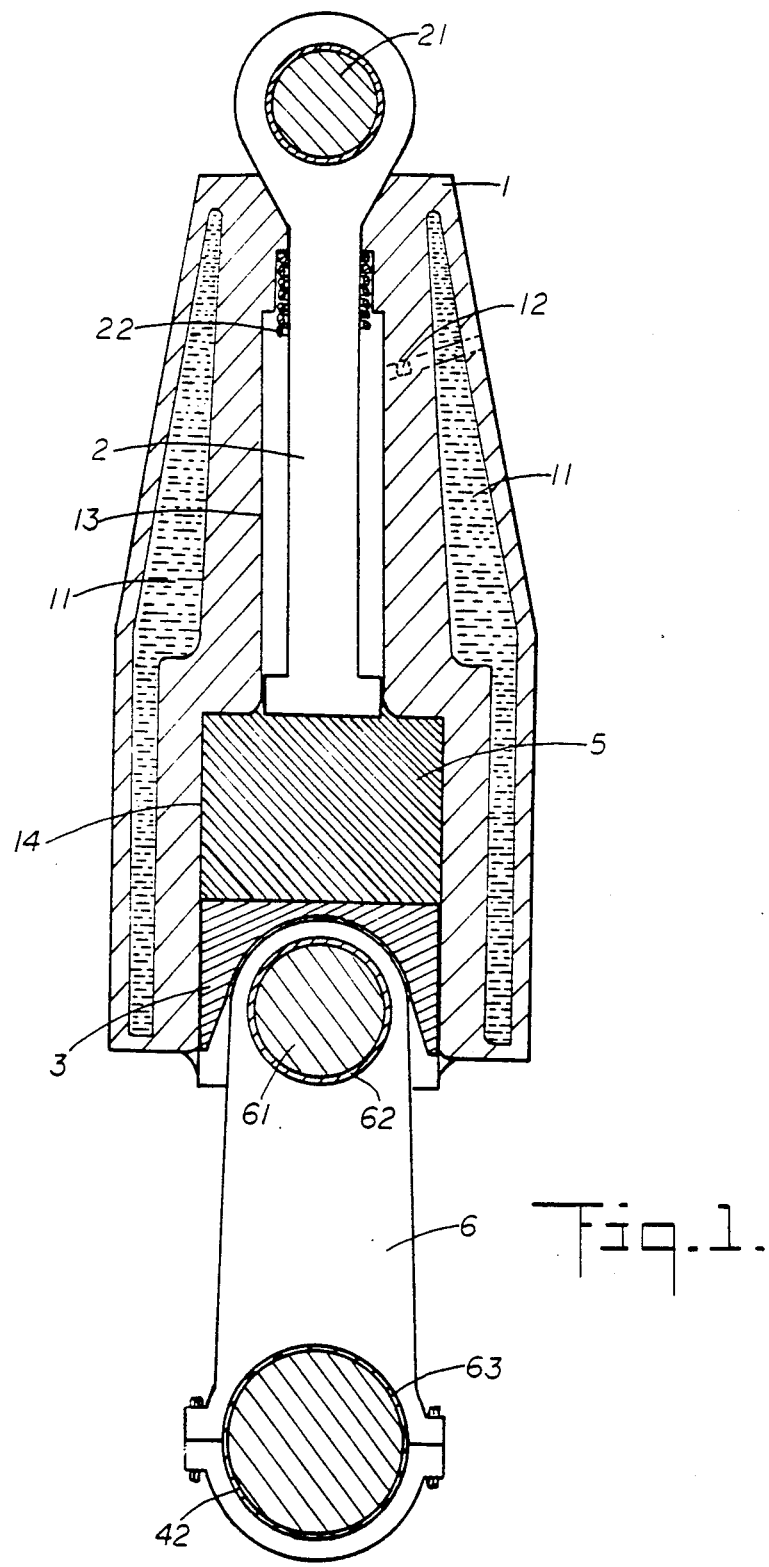
FIG. 1 is the side cutaway view of a hydraulic connecting rod according to the present invention.

Referring to FIG. 1, there is shown a hydraulic connecting rod comprising hydraulic cylinder housing 1, smaller hydraulic piston 2, hydraulic fluid 5, larger hydraulic piston 3 and lower connecting rod 6. The hydraulic cylinder housing 1 comprises smaller 13 and larger 14 hydraulic cylinders, wherein hydraulic fluid 5 is located between said pistons 2 and 3 and wherein reciprocating motion of said pistons 2 and 3 is performed. The fluid 5, shown in all figures as shaded areas, is of an incompressible frictionless type and is displaced up and down through the smaller 13 and larger 14 cylinder by smaller piston 2 and larger piston 3. Displacement of the fluid 5 from the smaller cylinder 13 always equals the length of the engine piston's 7 stroke and displacement from the larger cylinder 14 always equals the length of the crankshaft throw 4 rotating motion diameter which depends on the diameter ratio of the two hydraulic pistons 2 and 3. The smaller hydraulic piston 2 is a solid cylindrically shaped pin which is connected at its upper end to the engine piston 7 by a piston pin 21. The larger hydraulic piston 3 is a cup-shaped, cylindrical casting which is connected to the lower connecting rod 6 by a piston pin 61 (located inside a bearing 62). The lower connecting rod 6 is mounted on a bearing 63 which is mounted connected on the crankshaft throw 42.

Figure 2:
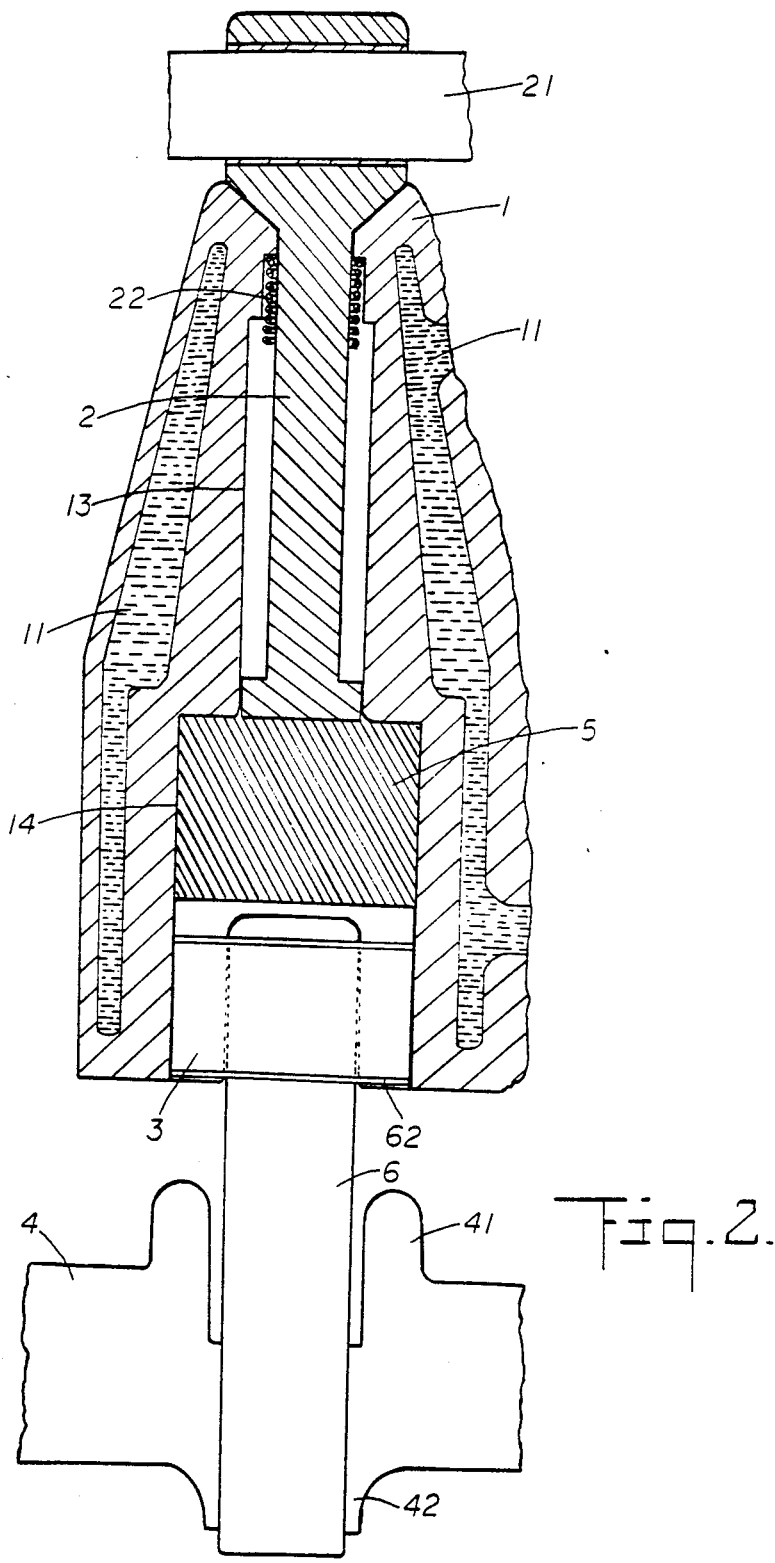
FIG. 2 is the front cutaway view of the hydraulic connecting rod of FIG. 1.
Figure 3:
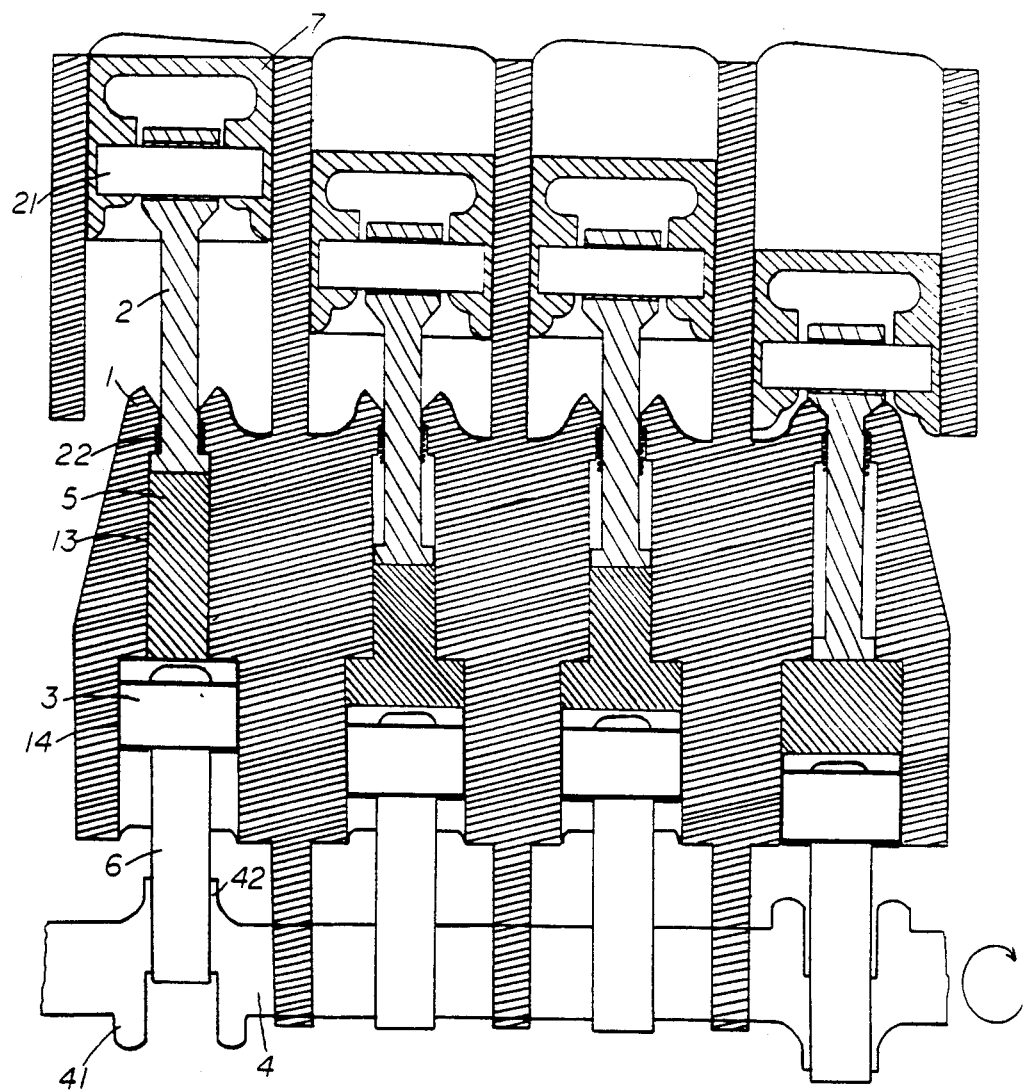
FIG. 3 is the front cutaway view of four connecting rods built in a four cylinder, in line, internal-combustion engine having the firing order 1-2-4-3.
Figure 4:
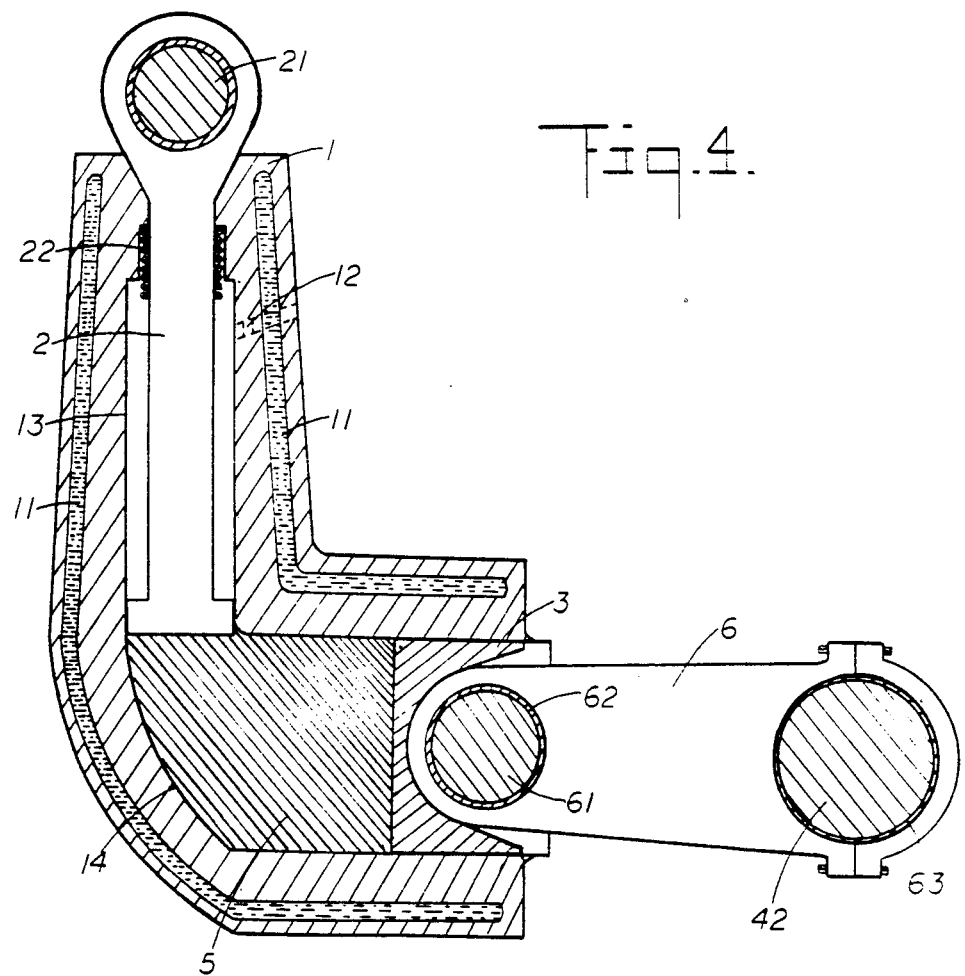
FIG. 4 is the side cutaway view of a half-horizontal hydraulic connecting rod according to the present invention.
Figure 5:
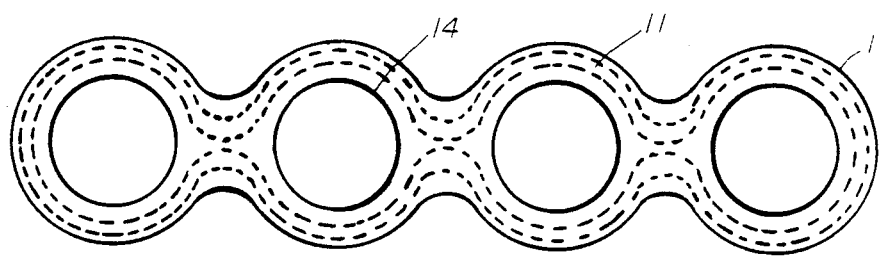
FIG. 5 is the bottom view of the four larger hydraulic cylinders' housing.
Figure 7:
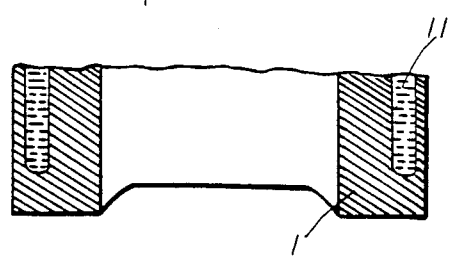
FIG. 7 is the front cutaway view of the larger hydraulic cylinder's bottom part.

As shown in FIGS. 1, 2, and 4, the bottom of the larger hydraulic piston 3 has two different lengths which suit the shape of the bottom part of the larger cylinder 14, shown in FIG. 7, and enable lower connecting rod 6 performance without increasing the total length of the hydraulic connecting rod. The length of the larger cylinder 14 and the larger piston 3 is extended on the sides which are parallel with the line of lower rod 6 motion. The bottom part of the smaller piston 2 is shaped to fit the smaller cylinder 13 and the upper part of the smaller cylinder is shaped to fit the cylinder housing 1, as shown in FIG. 1, 2, 3, and 4.

The smaller cylinder 13 is, on its upper part provided with the spring 22 which (when compressed by the bottom part of the smaller piston 2) enables smooth stopping of the engine piston 7 at its top dead center position by absorbing the inertia load of the engine piston 7 and the smaller hydraulic piston 2. The hydraulic cylinder housing 1 is also provided with water passages 11 for the purpose of cooling the cylinders 13 and 14, pistons 2 and 3 and hydraulic liquid 5. It is assumed that the surfaces of both cylinders 13 and 14 and pistons 2 and 3 are manufactured of a resistible material with good heat dissipation ability and in a shape which will cause the smallest possible leakage loss. However, according to the process of the present invention it is proposed that leakage loss of fluid 5 is compensated by the additional fluid from an external reservoir (not shown in FIGS.) through a one-way intake valve 12, built in the cylinder housing 1 as shown on FIGS. 1 and 4.

The process of the present invention will now be further described starting with the engine power stroke, wherein the engine piston 7 is pushed down by combustion pressure created inside the engine cylinder as a consequence of burning (ignition) of the air-fuel mixture. According to the process of the present invention, during its power stroke, the engine piston transmits the force caused by combustion pressure onto the smaller hydraulic piston 2.

Unlike prior art constructions in which the connecting rod connects the engine piston directly to the crankshaft, the transmission of combustion pressure according to the process of the present invention is in a straight line and, therefore, eliminates most of the piston-ring friction. This is significant since piston-ring friction accounts for ¾ of total friction in the engine and results in uneven wear of the engine cylinder walls. Uneven wear results in tapering of the cylinder wall which results in decreased combustion pressure and allows oil to enter and burn inside the engine cylinder. Because of the straight line motion of the engine piston of the present invention, (and consequent elimination of side thrust as discussed above), the engine piston 7 can have a more simple design and lower weight which will further decrease its inertia load. Furthermore, the engine piston 7 and the smaller hydraulic piston 2 can be manufactured as one solid part, if proven more efficient for the purpose of the present invention. Further, since the transmission of force exerted by the smaller piston 2 is also in a straight line, the piston 2 and the smaller cylinder 13 walls will not wear unevenly and will obviate problems associate with friction and tapered wear as discussed above.

The force exerted by the smaller hydraulic piston 2 on the hydraulic liquid 5 is (according to the law of hydraulics) increased proportionally to the pistons' diameter ratio, when exerted on the larger piston 3. Since the ratio between the areas of the smaller hydraulic piston 2 and the larger hydraulic piston 3, for the purpose of the present invention, is 1:2 the force exerted by the smaller piston will be increased by a factor of two when exerted on the larger piston 3. This force is then exerted on the crankshaft throw 42 via the lower rod 6 which is mounted on the pin 61 of the larger piston 3 (preferably via a bearing 62) and on crankshaft throw 42 (preferably via a bearing 63). Since the displacement of fluid 5 from the smaller cylinder 13 causes the larger piston 3 to move only half as far as the smaller piston 2, the crankshaft throw 42 rotating diameter is only half of the crankshaft throw rotating diameter for a construction using a solid connection between the engine piston and crankshaft throw as in the prior art.

Assuming that doubled force transmitted by the lower rod 6 acts at the same angle and that crankshaft throw diameter is two times shorter, the torque of the crankshaft 4 equals the torque provided by the same combustion pressure using a prior art construction, assuming that no significant friction loss occurs during the piston's downward movement.

Since the crankshaft throw 42 rotation diameter is two times smaller than that of the connecting rod in the prior art, the centrifugal force which imposes a centrifugal load on the crankshaft throw bearing will be two times weaker and therefore enable a significant decrease in the length and weight of the crankshaft counterweights 41 (which are used to offset eccentric masses of metal in the crankshaft throws). The smaller centrifugal load and the smaller distance from the crankshaft rotating center will also enable crankshaft throws 42 to be lighter which will further reduce inertia load. Since inertia load decreases four times for a two times shorter crankshaft throw 42 and counterweight 41, the resultant load of combustion pressure will significantly increase. Knowing that centrifugal force significantly increases with crankshaft rotating speed and at high operating speed produces significant centrifugal load, it is obvious that the present invention will significantly improve performance of engines operating at high speed (rounds per minute). Further, since inertia load increases with any change in an engine's operating speed, it is also obvious that the engine will have better acceleration and smoother slow down procedure (deceleration and/or braking). Assuming that transmission of force (caused by combustion pressure) through the hydraulic fluid 5 will result in much smoother rotation of crankshaft 4 and that centrifugal and inertia loads will significantly decrease, it is logical to assume that flywheel weight will also decrease thus yielding in further improvement in engine performance.

As shown in FIG. 3, when the engine piston 7 reaches its bottom dead center position, all fluid 5 is displaced from the smaller cylinder 13 and the larger piston 3 also reaches its bottom dead center position. Assuming that the inertia load of the larger piston 3 is significantly smaller than the inertia load of the engine piston of a prior art construction, because of its smaller weight and two times lower speed and because most of the engine piston 7 and smaller piston 2 inertia loads are absorbed by the fluid 5, the inertia load imposed on the crankshaft throw bearing 63 at this point will also be significantly smaller. It is assumed that a significant increase of resultant load during the first 90 degrees of power stroke crankshaft throw rotation will not produce a bigger engine vibration because of smoother transmission of the force through the hydraulic fluid 5.

While performing its downward and upward stroke, the larger piston 3 will experience side thrust, i.e., it will be unevenly forced toward the left and right part of larger cylinder 14 wall, and these frictions will result in uneven wear of both the piston 3 the said cylinder 14. The problems associated with tapered wear will be significantly smaller than those associated with tapered wear produced by piston rings in an engine piston cylinder of conventional construction, because of the much lower temperature and better permanent lubrication of the cylinder walls by the hydraulic fluid 5.

As mentioned before, it is proposed that any leakage loss which occurs is compensated through the one-way intake valve 12 built in cylinder housing 1. During the exhaust stroke which follows the power stroke, the crankshaft throw 42 forces the lower rod 6 upwards and the force exerted on larger piston 3 displaces the fluid 5 into the smaller cylinder 13 which further causes the smaller piston 2 to perform its upward stroke. According to the laws of hydraulics, the force exerted by larger piston 3 is two times weaker when exerted on the smaller piston 2 and equals the force exerted by the connecting rod in the prior art. The smaller piston 2, which further exerts the force exerted on it onto the engine piston 7, has two times higher speed, i.e., moves two times faster, than the larger piston 3 as a consequence of displacement of the fluid 5 into smaller cylinder 13 with two times smaller cross sectional area. When the larger piston reaches its top dead center position, the entire fluid 5 is displaced into the smaller cylinder 13 and the smaller piston is forced to its top dead center. In order to stop the smaller piston 2 and the engine piston smoothly, the cylinder housing 1 is provided with a spring 22 which absorbs both cylinders' inertia loads, therefore, the inertia load imposed on the crankshaft throw bearing 63 is not influenced by the smaller piston's 2 and the engine piston's 7 inertia loads. As the crankshaft 4 rotates, the intake stroke begins such that the force exerted by the crankshaft throw 42 on the lower rod 6 forces the larger piston 3 to move downward. The larger piston's 3 downward stroke forces displacement of the fluid 5 into the larger cylinder 14, causing the smaller piston 2 to perform its downward stoke. The force of the spring 22 (which is pressed at top dead center of smaller piston 2) helps at the beginning of the smaller piston's 2 downward stroke. As the smaller piston 2 performs its downward stroke, it forces engine piston 7 to move downward and perform the intake stroke. When the pistons reach their bottom dead center position, the compression stroke is continued as described above for the exhaust stoke. The spring 22 again stops the smaller piston 2 and engine piston 7 in their top dead center positions by absorbing their inertia loads. Since these inertia loads are absorbed through the performance of the spring, the ignition point can be adjusted to give the best possible result of combustion pressure during the power stroke.

Figure 6:
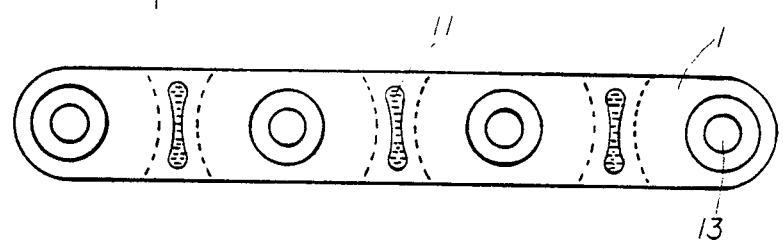
FIG. 6 is the top view of the four smaller hydraulic cylinders' housing.

As shown in FIG. 3, the hydraulic connecting rods for each engine cylinder are mounted in an engine cylinder block with its upper side shown in FIG. 6. This enables the connecting rods' housings to be held stationary and cooled by the water which circulates through the engine block, forced by the engine water pump. The water circulates through the water passages 11, shown in FIGS. 1, 2, 4, 5, and 6, according to the principle which will allow the most optimal performance according to the type of engine.

It is to be understood that the housings of the hydraulic connecting rods can be mounted on some other part of the engine block, if proven more suitable for the purpose of the present invention.

As shown in FIG. 4, the hydraulic connecting rod can be designed with its lower part having a horizontal position, in order to avoid any disadvantage caused by use of a significantly longer hydraulic connecting rod than the connecting rod in the prior art. While having the same operating process this hydraulic connecting rod transmits the force produced by combustion pressure on the crankshaft which is located on the left or right side of the engine cylinder. It is to be understood that the crankshaft for this version of hydraulic connecting rod can be located at any angle with respect to engine cylinder, proven the most suitable for the purpose of the present invention. The only difference in operating process of the two above described hydraulic connecting rods is that a connecting rod with its lower part in horizontal position requires more fluid 5 between the smaller 2 and larger 3 piston because its shape does not allow the entire amount of fluid 5 to be displaced from the larger cylinder 14.

According to the above-stated facts, it is obvious for those skilled in the art, that the present invention will eliminate most of piston-ring friction (which accounts for up to 70% of total friction in the engine) and will enable a more simple and lighter engine piston construction. Further, it will enable the engine piston and cylinder wall to be more durable and prevent loss of combustion pressure. Since the present invention will eliminate most of the centrifugal and inertia loads which cause combustion pressure force to decrease, the resultant load of combustion pressure force will significantly increase. Together with a decrease of engine vibration and lighter total rotating mass in the engine, this will significantly increase engine total power output. In the case of motor vehicles, improved engine acceleration and slow down procedure (deceleration) will result with improved acceleration and braking performance and, therefore, increased driving safety.

It is to be understood that the present invention has been described in relation to particular embodiments, herein chosen for the purpose of illustration and that the claims are intended to cover all changes and modifications, apparent to those skilled in the art which do not constitute a departure from the scope and spirit of the invention.

What is claimed is:

1. A hydraulic connecting rod for connecting an engine piston to an engine crankshaft, the hydraulic connecting rod comprising:

a housing, the housing having first and second cylinders formed therein, the first and second cylinders being in fluid communication with one another and each having a predetermined diameter, the diameter of the first cylinder being less than the diameter of the second cylinder;

a small piston, the small piston comprising a head portion and a rod portion, the head portion being slidably received within the first cylinder in the housing and the rod portion being slidable into and out of the housing, the rod portion having a first end connected to the head portion and a second end connected to the engine piston;

a large piston, the large piston having a piston head, the piston head being slidable received within the second cylinder;

a connecting rod connecting the large piston to the engine crankshaft;

the small piston and the large piston being spaced from one another so as to define a substantially fixed volume chamber bounded by the heads of the small and large piston and at least one of the first and second cylinders; and an incompressible hydraulic fluid substantially filling the chamber so as to provide a fluid connection between the small piston and the large piston.

2. The hydraulic connecting rod of claim 1, wherein the housing has an opening formed therein and the rod portion of the small piston extending through the opening; and further comprising a spring, the spring being located within the housing and surrounding the rod portion such that the spring is compressed by the piston head during at least a portion of the piston's movement within the first cylinder.

3. The hydraulic connecting rod of claim 1, further comprising a fluid passage having at least a portion extending through the housing and communicating with one of the first and second cylinders; and a one-way valve provided in the fluid passage so as to allow fluid to pass through the passage into the said one of the first and second cylinders but preventing passage of fluid out of the said one of the first and second cylinders.

4. The hydraulic connecting rod of claim 1, further comprising a coolant passage formed in the housing, the coolant passage being separated from the first and second cylinders; and a fluid coolant being located in the passage whereby passage of the coolant through the coolant passage results in cooling of the housing.

5. The hydraulic connecting rod of claim 4, wherein the coolant contains water.

6. The hydraulic connecting rod of claim 1, wherein the head portion of the small piston is integral with the rod portion of the small piston.

7. The hydraulic connecting rod of claim 1, wherein the rod portion of the small piston is a unitary element having one end connected to the piston head portion of the small piston and another end connected to the engine piston.

8. The hydraulic connecting rod of claim 1, wherein the first cylinder opens up into the second cylinder so as to allow unrestricted passage of fluid from the first cylinder to the second cylinder.

9. The hydraulic connecting rod of claim 1, wherein the first and second cylinders each have a predetermined volume per unit length and wherein the volume per unit length of the second cylinder is a least two times the volume per unit length of the first cylinder.

10. The hydraulic connecting rod of claim 1, wherein the diameter of the large piston is at least 1.4 times as great as the diameter of the smaller piston.

11. The hydraulic connecting rod of claim 1, wherein the large and small diameter pistons are substantially simultaneously slidable between top dead center positions and bottom dead center positions;

the second cylinder having an end wall, the end wall having a circular opening formed therein, the circular opening having a diameter equal to the diameter of the first cylinder such that the first cylinder opens directly into the end wall of the second cylinder; and wherein the large piston and small piston are arranged and dimensioned such that when the large and small diameter pistons are at their top dead center positions, substantially all of the hydraulic fluid is located in the first cylinder and the large piston head is located adjacent to the end wall and when the large piston and small piston are in their bottom dead center positions, substantially all of the hydraulic fluid is in the second cylinder.

12. The hydraulic connecting rod of claim 1, wherein the large and small diameter pistons are simultaneously slidable between top dead center positions and bottom dead center positions; and wherein when the large and small diameter pistons are in the top dead center position, substantially all of the hydraulic fluid is in the first cylinder and when the large and small diameter piston are in the bottom dead center position substantially all of the hydraulic fluid is in the second cylinder.

13. The hydraulic connecting rod of claim 1, wherein the second cylinder is arranged at an angle with respect to the first cylinder such that the large piston and small piston slide along non-parallel paths.

14. The hydraulic connecting rod of claim 13, wherein the second cylinder is formed at a right angle to the first cylinder.

15. A hydraulic connecting rod for connecting an engine piston to an engine crankshaft, the hydraulic connecting rod comprising:
   a housing, the housing having first and second cylinders formed therein, the first and second cylinders being in fluid communication with one another and each having a predetermined diameter, the diameter of the second cylinder being at least 1.4 times the diameter of the second cylinder;
   a small piston, the small piston comprising a head portion, the head portion having an outer periphery dimensioned for substantially fluid tight contact with the first cylinder and so as to allow sliding of the head portion within the first cylinder between a top dead center position and a bottom dead center position, the rod portion being slidable into and out of the housing and having a first end connected to the head portion and a second end connected to the engine piston;
   a large piston, the large piston having a piston head, the piston head having an outer periphery dimensioned for substantially fluid tight contact with the second cylinder and to allow sliding of the piston head within the second cylinder between a top dead center position and a bottom dead center position;
   a substantially fixed volume variable shaped chamber bounded by the heads of the small and large piston and at least one of the first and second cylinders; and
   an incompressible hydraulic fluid substantially filling the chamber so as to provide a fluid connection between the small piston and the large piston, whereby the large and small piston move substantially simultaneously between their respective top dead center positions and bottom dead center positions.

16. The hydraulic connecting rod of claim 15, wherein the housing has an opening formed therein and the rod portion of the small piston extends through the opening; and
   further comprising a spring, the spring being located within the housing and surrounding the rod portion such that the spring is compressed by the small piston head when the small piston head approaches its top dead center position.

17. The hydraulic connecting rod of claim 15, further comprising a fluid passage having at least a portion thereof extending through the housing and communicating with at least one of the first and second cylinders, and a one-way valve provided in the fluid passage so as to allow fluid to pass through the passage into the said one of the first and second cylinders but preventing passage of the fluid out of the said one of the first and second cylinders.

18. A multi-rod hydraulic connecting apparatus for connecting the engine pistons of a multi-cylinder engine to an engine crankshaft, the connecting apparatus comprising:
   a housing, the housing having a plurality of first cylinders and a plurality of second cylinders formed therein, each of the first cylinders being in fluid communication with one of the second cylinders, each of the first cylinders having the same predetermined diameter and each of the second cylinders having the same predetermined diameter, the diameter of the first cylinders being less than the diameter of the second cylinders;
   a plurality of small pistons, each of the small pistons having a head portion and a rod portion, the head portion being slidably received within one of the first cylinders and the rod portion being slidable into and out of the housing, the rod portion having a first end connected to the head portion and a second end connected to one of the engine pistons of the multicylinder engine;
   a plurality of large pistons, each of the large pistons having a piston head, the piston head being slidably received within one of the second cylinders;
   a plurality of connecting rods, each of the connecting rods connecting one of the plurality of large pistons to the engine crankshaft;
   a plurality of substantially fluid tight chambers, each of the chambers being bounded by a large piston, a small piston and at least one of a first and second cylinder; and
   an incompressible hydraulic fluid essentially filling each of the fluid tight chambers so as to provide a fluid connection between one of the small pistons and one of the large pistons such that the small and large piston so connected move substantially simultaneously within their respective cylinders.

19. The multi-rod connecting apparatus of claim 18 further comprising at least one coolant passage formed in the housing, the coolant passage being separated from the plurality of substantially fluid tight chambers; and
   a coolant located within the cooling passage for cooling the connecting apparatus.

20. The hydraulic connecting apparatus of claim 18, further comprising a plurality of openings formed in the housing, a rod portion of one of the small pistons extending through each of the openings;
   the apparatus further comprising a plurality of springs, each of the springs being located in the housing and surrounding the rod portion of one of the small pistons such that the spring is compressed by the piston head during at least a portion of the piston head's movement within the first cylinder.

* * * * *